C. R. KITTLE.
SEAT FOR MOTOR CYCLES AND OTHER SELF PROPELLED VEHICLES.
APPLICATION FILED OCT. 30, 1909.
971,848.
Patented Oct. 4, 1910.
2 SHEETS—SHEET 1.
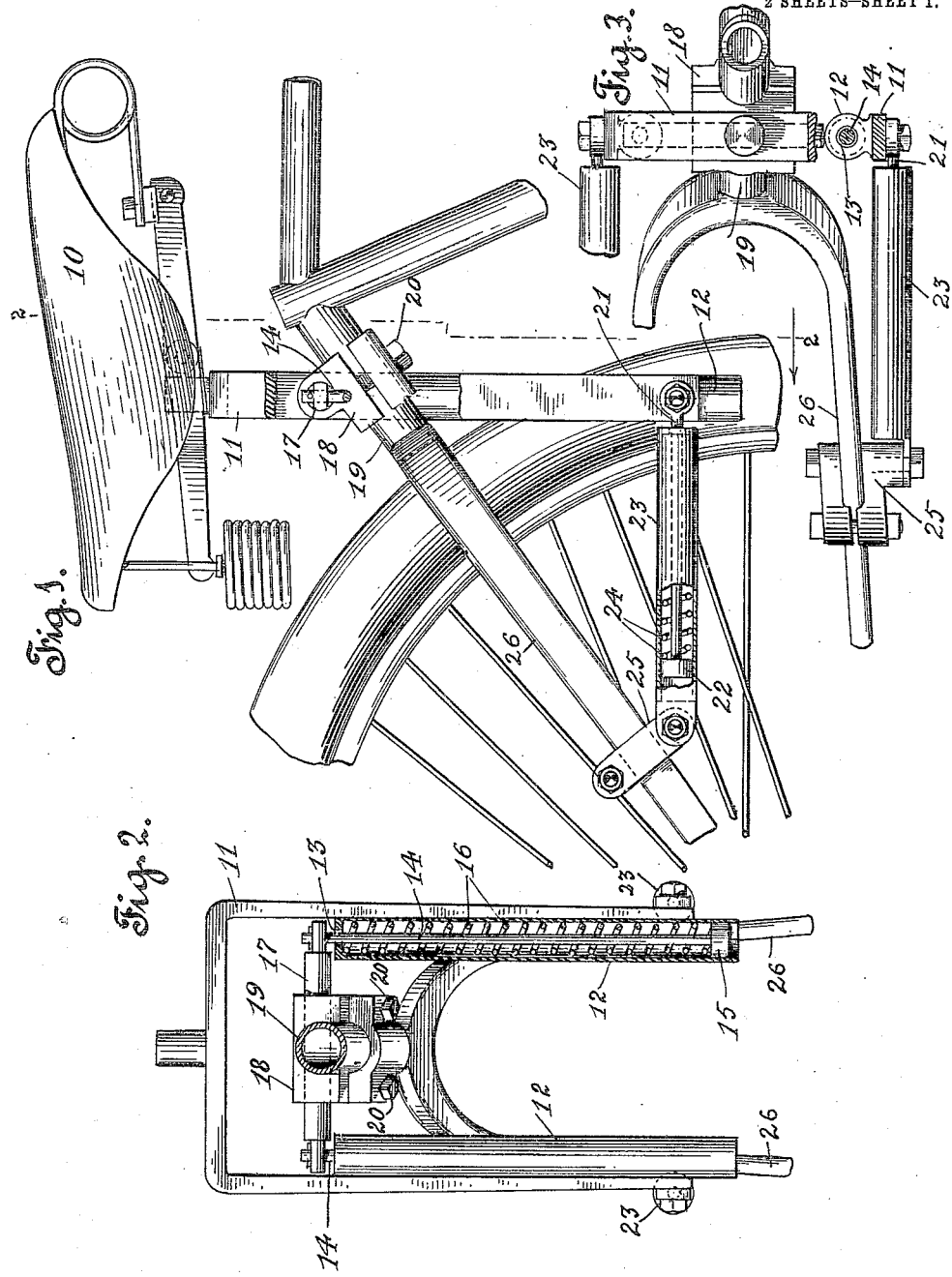
Witnesses,
Inventor,
Charles R. Kittle,
By
    Attorney.

C. R. KITTLE.
SEAT FOR MOTOR CYCLES AND OTHER SELF PROPELLED VEHICLES.
APPLICATION FILED OCT. 30, 1909.
971,848.
Patented Oct. 4, 1910.
2 SHEETS—SHEET 2.
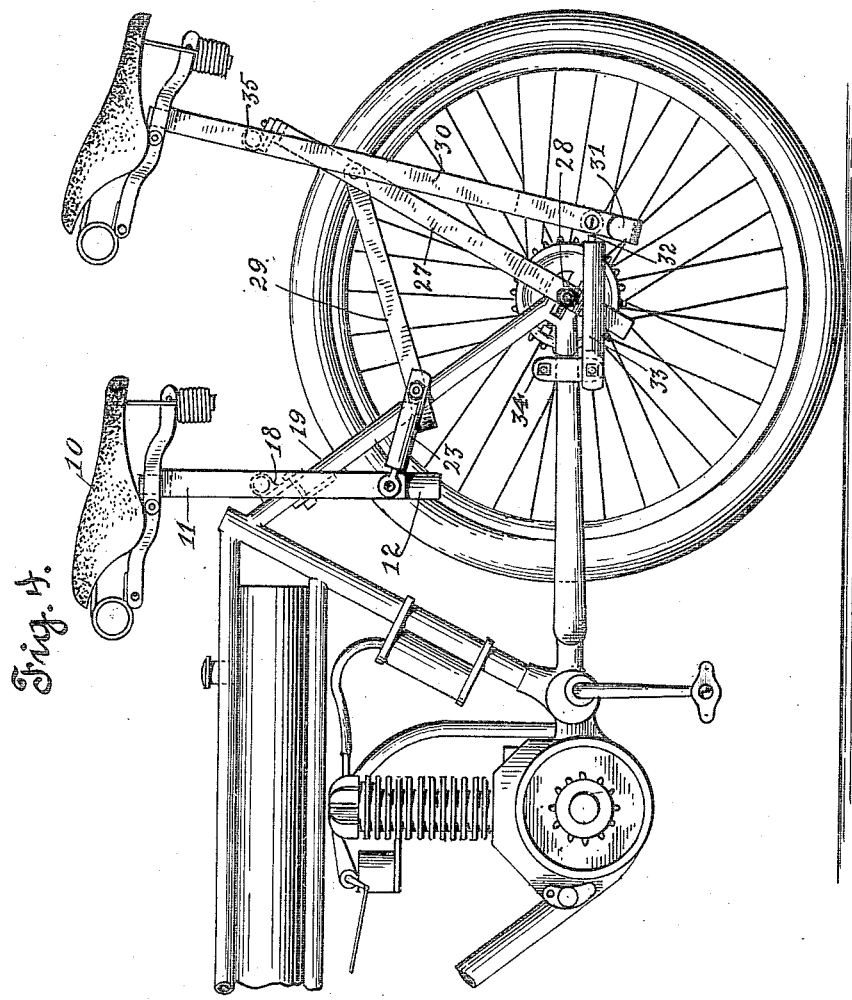
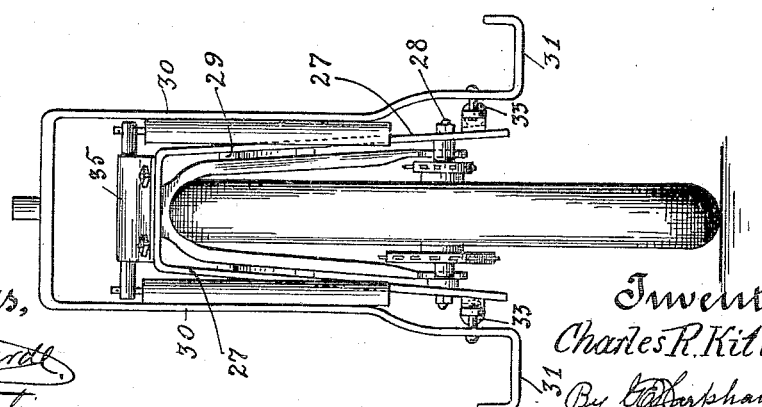
Witnesses,
Inventor,
Charles R. Kittle,
By
Attorney.

UNITED STATES PATENT OFFICE.

CHARLES R. KITTLE, OF LOS ANGELES, CALIFORNIA.

SEAT FOR MOTOR-CYCLES AND OTHER SELF-PROPELLED VEHICLES.

971,848. Specification of Letters Patent. Patented Oct. 4, 1910.

Application filed October 30, 1909. Serial No. 525,465.

*To all whom it may concern:*

Be it known that I, CHARLES R. KITTLE, a citizen of the United States, residing in the city of Los Angeles, county of Los Angeles, State of California, have invented new and useful Improvements in Seats for Motor-Cycles and other Self-Propelled Vehicles, of which the following is a specification.

In motor cycles and self propelled vehicles such as bicycles, there is considerable jar upon the rider with the best constructed spring seats on the market, and the great vibration of running at high speed causes the frame work carrying the springs to soon wear out.

My invention is primarily designed for motor cycle seats, but may be used on any self propelled vehicles such as bicycles etc.

The object of my invention is to so mount the seat or seats of a motor cycle or other vehicle that there may be the maximum amount of vertical resiliency and also to permit of a rocking motion of that portion of the frame in which the main springs are mounted, thus relieving the same from the excessive wear occasioned when the movement of that part of the frame is confined to the vertical and at the same time to prevent or reduce the amount of jar upon the rider. I accomplish this object by the mechanism described herein and illustrated in the accompanying drawings, in which;

Figure 1 is a fragment of a portion of the frame and rear wheel of a motor cycle equipped with my improved seat, with parts in section and parts broken away. Fig. 2 is a view of the spring frame on a plane at right angles to that of Fig. 1 being taken on the line 2—2 of Fig. 1, with a portion of the spring frame in section. Fig. 3 is a fragmentary bottom plan view of the lower portion of the spring frame. Fig. 4 shows the manner of mounting my improved seat upon a motor cycle as a part of a tandem attachment. Fig. 5 is a rear view of the parts shown in Fig. 4 with the top portion removed.

In the drawings 10 is the saddle which may be of any approved construction which is mounted upon the saddle frame 11. This saddle frame is preferably U-shaped as best shown in Fig. 2 and straddles the rear fork and a portion of the wheel. Upon the inner sides, and rigidly secured thereto in any suitable manner, preferably by brazing, are the spring holding barrels 12, which are closed at the upper end except at the central aperture 13. Through this aperture projects plunger rods 14, upon the lower ends of which are secured plungers 15 which have a loose working fit in the spring holding barrels. Springs 16 are coiled around these rods between the plungers and the upper ends of the barrels. The upper ends of rods 14 are removably secured to a horizontal sustaining cross bar 17 which is revolubly mounted in the upper member of a two part clamp 18 which is secured upon the rear fork 19 by means of bolts 20. This construction takes off the vertical jar.

The lower portion of the saddle frame at each side thereof has pivotally secured thereto the horizontal plunger rods 21 which are secured to the horizontal plungers 22 at their other ends. These plungers work in the horizontal spring holding barrels 23, and between the plungers and the ends of the barrels, and coiled around the plunger rods are springs 24. The rear end of each horizontal spring holding barrel is pivotally secured to a clamp 25, which is clamped upon the side member 26 of the rear fork. By means of these last parts the saddle frame is kept in a substantially vertical position when the machine is in operation, and at the same time the horizontal springs permit the saddle frame to have a rocking motion whereby a portion of the horizontal jar is relieved and the vertical movement of the plunger is better accommodated, thereby lessening the wear on the same. In Figs. 4 and 5 I have shown the same as a part of a tandem attachment. When using the same as a part of a tandem attachment I mount a U-shaped tandem frame 27 upon the axle 28 of the rear wheel of the machine. At each side, the upper portion of the tandem frame is secured to the upper side members of the rear fork by the brace bars 29. As shown in Figs. 4 and 5 the side members 30 of the saddle frame in the tandem attachment preferably extend to below the axle of the rear wheel and are provided with foot rests 31 to support the feet of the tandem rider. The lower end of the tandem saddle frame has pivotally secured thereto a plunger rod 32 which works in barrel 33. Around this plunger rod and within the barrel are springs similar to springs 24 shown in Fig. 1. Barrel 33 is pivotally secured to clamp 34 which is secured to the lower side members of the rear fork. The saddle frame is secured upon the tandem frame 27 by clamp 35. In all other respects the saddle frame is constructed like the main saddle frame.

Where cheapness of construction is desired, the lower end of the saddle frame could be secured by means of a link bar instead of the spring barrel, spring and plunger rod, shown and described herein, but in such case the jar that is taken off by the giving of the springs would still exist, and the vertical wear would not be as well compensated as in the construction described.

When it is desired to use the machine without the tandem seat, by unloosening clamp 35 from frame 27, and barrel 33 from clamp 34 the seat is quickly removed without disarranging any other parts of the machine, and a carrier basket may be secured to the tandem frame 27 in any appropriate manner.

Having described my invention what I claim is:

1. A seat for motor cycles and other like vehicles comprising a U-shaped saddle frame; a saddle mounted on said frame; spring holding barrels secured to the side members of said frame, said barrels being closed at the top, except at a central aperture; a plunger rod having a plunger on the end thereof mounted in each of said barrels; springs coiled around said rods between the plungers and the upper ends of the barrels; a horizontal sustaining bar connected to said plunger rods; a clamp secured upon the rear portion of the vehicle frame, said sustaining bar being pivotally mounted in said clamp.

2. A seat for motor cycles and other self-propelled vehicles comprising a clamp secured upon the rear portion of the frame of the vehicle; a sustaining bar pivotally and horizontally mounted in said clamp; plunger rods connected to the ends of said sustaining bar; plungers on the other end of said rods; barrels mounted upon said rods and plungers, said barrels being closed at the top except at a central aperture; springs around said rods within said barrels; a U-shaped frame secured to said barrels; means secured to the lower ends of said U-shaped frame and to the rear portion of the vehicle frame, adapted to hold said U-shaped frame in a vertical position and to yield when the rear portion of the U-shaped frame is moved in one direction; and a saddle secured upon the top of said U-shaped frame.

3. A seat for motor cycles and other self propelled vehicles comprising a U-shaped saddle frame; a saddle on said frame; a U-shaped sustaining frame pivotally mounted on the rear portion of the vehicle frame; and a resilient connection between the saddle frame and the sustaining frame.

4. A seat for motor cycles and other self propelled vehicles comprising a U-shaped saddle frame; a saddle on said frame; a U-shaped sustaining frame pivotally mounted upon the rear portion of the vehicle frame, said saddle frame and sustaining frame being connected with resilient means interposed between the parts of the frames; and means pivotally secured to the lower portion of the saddle frame and to the vehicle frame to hold the saddle frame vertical when the machine is being operated.

In witness that I claim the foregoing I have hereunto subscribed my name this 20th day of October, 1909.

CHAS. R. KITTLE.

Witnesses:
   G. E. HARPHAM,
   S. B. AUSTIN.